(12) United States Patent
Bouguettaya

(10) Patent No.: US 9,221,073 B2
(45) Date of Patent: *Dec. 29, 2015

(54) HIGH MOLECULAR WEIGHT POLYCARBODIIMIDE AND METHOD OF PRODUCING SAME

(75) Inventor: Mohamed Bouguettaya, Farmington, MI (US)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/241,211

(22) PCT Filed: Aug. 29, 2012

(86) PCT No.: PCT/US2012/052828
§ 371 (c)(1),
(2), (4) Date: Feb. 26, 2014

(87) PCT Pub. No.: WO2013/033186
PCT Pub. Date: Mar. 7, 2013

(65) Prior Publication Data
US 2014/0221580 A1    Aug. 7, 2014

Related U.S. Application Data

(60) Provisional application No. 61/528,969, filed on Aug. 30, 2011.

(51) Int. Cl.
*B05D 1/02* (2006.01)
*C08G 18/76* (2006.01)
*C08G 18/02* (2006.01)
*C09D 179/08* (2006.01)
*B05D 3/02* (2006.01)

(52) U.S. Cl.
CPC .. *B05D 1/02* (2013.01); *B05D 3/02* (2013.01); *C08G 18/025* (2013.01); *C08G 18/7621* (2013.01); *C09D 179/08* (2013.01); *C08G 2105/06* (2013.01)

(58) Field of Classification Search
CPC ............. C08G 18/7621; C08G 18/025; C08G 105/06; B05D 1/02; B05D 3/02; C09D 179/08
USPC ........................................................ 525/452
See application file for complete search history.

(56) References Cited

U.S. PATENT DOCUMENTS

| | | |
|---|---|---|
| 2,941,966 A | 6/1960 | Campbell |
| 2,941,983 A | 6/1960 | Smeltz |
| 3,056,835 A | 10/1962 | Monagle, Jr. et al. |
| 3,152,131 A | 10/1964 | Heberling, Jr. |
| 3,406,197 A | 10/1968 | Ulrich |
| 3,406,198 A | 10/1968 | Budnick |
| 3,522,303 A | 7/1970 | Ulrich |
| 4,066,629 A | 1/1978 | Edelman |
| 4,143,063 A | 3/1979 | Alberino et al. |
| 5,416,184 A * | 5/1995 | Amano et al. .................. 528/44 |
| 5,498,356 A | 3/1996 | Kamakura et al. |
| 5,554,330 A | 9/1996 | Flannery et al. |
| 5,637,769 A | 6/1997 | Imashiro et al. |
| 5,650,476 A | 7/1997 | Amano et al. |
| 5,654,474 A | 8/1997 | Ishii et al. |
| 5,750,636 A | 5/1998 | Komoto et al. |
| 5,750,637 A * | 5/1998 | Takiguchi et al. ............ 528/310 |
| 5,837,801 A | 11/1998 | Yahata et al. |
| 5,939,200 A | 8/1999 | Amano et al. |
| 6,001,951 A | 12/1999 | Fukuoka et al. |
| 6,008,311 A | 12/1999 | Sakamoto et al. |
| 6,017,742 A | 1/2000 | Takenishi et al. |
| 6,090,906 A | 7/2000 | Amano et al. |
| 6,107,448 A * | 8/2000 | Sakamoto et al. ............ 528/310 |
| 6,166,466 A | 12/2000 | Amano et al. |
| 6,204,342 B1 | 3/2001 | Nava |
| 6,221,200 B1 | 4/2001 | Saito et al. |
| 6,313,258 B1 | 11/2001 | Sakamoto et al. |

(Continued)

FOREIGN PATENT DOCUMENTS

| | | |
|---|---|---|
| CA | 2 760 721 A1 | 11/2010 |
| CN | 1220674 A | 6/1999 |

(Continued)

OTHER PUBLICATIONS

International Search Report for Application No. PCT/US2014/018331 dated Aug. 19, 2014, 3 pages.
Database WPI, "XP002727932", Week 199246, Thomson Scientific, London, GB, AN 1992-378225.
English language abstract for JPH 04-279618 extracted from PAJ database on Sep. 10, 2014, 1 page.
International Search Report for Application No. PCT/US2012/052828 dated Nov. 9, 2012, 4 pages.
English language abstract for JPS 63-161027 extracted from PAJ database on Jun. 9, 2014, 6 pages.
English language abstract and machine-assisted English translation for JPH 05-195483 extracted from PAJ database on Jun. 9, 2014, 28 pages.

(Continued)

*Primary Examiner* — Randy Gulakowski
*Assistant Examiner* — Christopher M Rodd
(74) *Attorney, Agent, or Firm* — Howard & Howard Attorneys PLLC

(57) ABSTRACT

A method of producing the high molecular weight polycarbodiimide comprises the steps of providing an isocyanate component comprising toluene diisocyanate (TDI), a carbodiimidization catalyst, and a first solvent. The method further comprises the step of polymerizing the isocyanate component in the first solvent and in the presence of the carbodiimidization catalyst to produce a reaction mixture including at least one carbodiimide compound and the first solvent. In addition, the method comprises the step of combining a second solvent and the reaction mixture. Finally, the method comprises the step of polymerizing the at least one carbodiimide compound for a second period of time in the first and second solvents and in the presence of the carbodiimidization catalyst to produce the high molecular weight polycarbodiimide.

20 Claims, No Drawings

(56) References Cited

U.S. PATENT DOCUMENTS

| | | | |
|---|---|---|---|
| 6,414,105 | B2 | 7/2002 | Misumi et al. |
| 6,420,018 | B1 | 7/2002 | Inoue et al. |
| 6,420,035 | B1 | 7/2002 | Amano et al. |
| 6,979,703 | B2 | 12/2005 | Takahashi et al. |
| 7,258,921 | B2 | 8/2007 | Hashiba et al. |
| 7,718,255 | B2 | 5/2010 | Namikawa et al. |
| 2002/0055606 | A1 | 5/2002 | Misumi et al. |
| 2004/0158021 | A1 | 8/2004 | Sadayori et al. |
| 2005/0261448 | A1 | 11/2005 | Takahashi et al. |
| 2010/0065209 | A1 | 3/2010 | Burghardt et al. |
| 2012/0123062 | A1 | 5/2012 | Laufer et al. |

FOREIGN PATENT DOCUMENTS

| | | |
|---|---|---|
| EP | 0 398 069 A2 | 11/1990 |
| EP | 0 557 906 A1 | 9/1993 |
| EP | 0 928 825 A2 | 7/1999 |
| EP | 0 969 029 A1 | 1/2000 |
| JP | S 63-161027 A | 7/1988 |
| JP | H 04-279618 A | 10/1992 |
| JP | H 05-195483 A | 8/1993 |
| JP | H 07-257980 A | 10/1995 |
| JP | H 08-081533 A | 3/1996 |
| JP | H 08-216253 A | 8/1996 |
| JP | H 08-300469 A | 11/1996 |
| JP | H 09-111011 A | 4/1997 |
| JP | H 09-309951 A | 12/1997 |
| JP | H 10-030029 A | 2/1998 |
| JP | H 10-168266 A | 6/1998 |
| JP | H 11-060667 A | 3/1999 |
| JP | H 11-123869 A | 5/1999 |
| JP | 2000-143754 A | 5/2000 |
| JP | 2000-204157 A | 7/2000 |
| JP | 2003-082297 A | 3/2003 |
| JP | 2003-082298 A | 3/2003 |
| JP | 2005-162997 A | 6/2005 |
| JP | 2006-077110 A | 3/2006 |
| JP | 2007-154024 A | 6/2007 |
| JP | 2008-291222 A | 12/2008 |
| WO | WO 00/21749 A1 | 4/2000 |

OTHER PUBLICATIONS

English language abstract and machine-assisted English translation for JPH 07-257980 extracted from PAJ database on Jun. 9, 2014, 13 pages.
English language abstract and machine-assisted English translation for JPH 08-081533 extracted from PAJ database on Jun. 9, 2014, 37 pages.
English language abstract and machine-assisted English translation for JPH 08-216253 extracted from PAJ database on Jun. 9, 2014, 82 pages.
English language abstract and machine-assisted English translation for JPH 08-300469 extracted from PAJ database on Jun. 9, 2014, 41 pages.
English language abstract and machine-assisted English translation for JPH 09-111011 extracted from PAJ database on Jun. 9, 2014, 14 pages.
English language abstract and machine-assisted English translation for JPH 09-309951 extracted from PAJ database on Jun. 9, 2014, 20 pages.
English language abstract and machine-assisted English translation for JPH 10-030029 extracted from PAJ database on Jun. 9, 2014, 21 pages.
English language abstract and machine-assisted English translation for JPH 10-168266 extracted from PAJ database on Jun. 11, 2014, 22 pages.
English language abstract and machine-assisted English translation for JPH 11-060667 extracted from PAJ database on Jun. 11, 2014, 39 pages.
English language abstract and machine-assisted English translation for JPH 11-123869 extracted from PAJ database on Jun. 11, 2014, 49 pages.
English language abstract and machine-assisted English translation for JP 2000-143754 extracted from PAJ database on Jun. 11, 2014, 22 pages.
English language abstract and machine-assisted English translation for JP 2000-204157 extracted from PAJ database on Jun. 11, 2014, 22 pages.
English language abstract and machine-assisted English translation for JP 2003-082297 extracted from PAJ database on Jun. 11, 2014, 32 pages.
English language abstract and machine-assisted English translation for JP 2003-082298 extracted from PAJ database on Jun. 11, 2014, 34 pages.
English language abstract and machine-assisted English translation for JP 2005-162997 18extracted from PAJ database on Jun. 11, 2014, 18 pages.
English language abstract and machine-assisted English translation for JP 2006-077110 extracted from PAJ database on Jun. 11, 2014, 52 pages.
English language abstract and machine-assisted English translation for JP 2007-154024 extracted from PAJ database on Jun. 11, 2014, 28 pages.
English language abstract and machine-assisted English translation for JP 2008-291222 extracted from PAJ database on Jun. 11, 2014, 62 pages.
Lyman, Donald J. et al., "Polycarbodiimides and Their Derivatives", Stanford Res. Inst., Makromolekulare Chemie (1963), 67, pp. 1-9.
Mochizuki, Amane et al., "Synthesis of Photosensitive Polycarbodiimide", Journal of Photopolymer Science and Technology, vol. 11, No. 2 (1998), pp. 225-230.
Song et al., Mechanical Properties of Composites Made With Wood Fiber and Recycled Tire Rubber, Institute of Materials Processing, Michigan Technological University, Forest Products Journal (2001), 51(5), pp. 45-51.
English language abstract for CN 1220674 extracted from espacenet.com database on May 7, 2015, 1 page.

* cited by examiner

HIGH MOLECULAR WEIGHT POLYCARBODIIMIDE AND METHOD OF PRODUCING SAME

RELATED APPLICATIONS

This application is the National Stage of International Patent Application No. PCT/US2012/052828, filed on Aug. 29, 2012, which claims priority to and all the advantages of U.S. Provisional Application No. 61/528,969, filed on Aug. 30, 2011, the content of which is incorporated herein by reference.

BACKGROUND OF THE INVENTION

1. Field of the Invention

The subject invention generally relates to a high molecular weight polycarbodiimide and, more particularly, to a high molecular weight polycarbodiimide having excellent physical properties and to a method of producing the high molecular weight polycarbodiimide.

2. Description of the Related Art

Polycarbodiimides are known in the art and include repeating structuring units represented by R—N=C=N—R, where R is an independently selected organic group, such as an aromatic group. Polycarbodiimides are known for having desirable physical properties, such as heat resistance, and have been utilized in applications such as moldings, coatings, films, etc.

Methods of producing polycarbodiimides are also known in the art. In conventional methods of producing polycarbodiimides, an organic isocyanate, such as an aromatic isocyanate, is polymerized in the presence of a carbodiimidization catalyst. Generally, the organic isocyanate is polymerized in the presence of the carbodiimidization catalyst while disposed in a solvent such that the polycarbodiimide is produced in solution.

However, in conventional methods of producing polycarbodiimides in solution, the polycarbodiimides precipitate and/or gel in the solvent once the polycarbodiimides reach a certain molecular weight, which is typically from 1,000 to 3,000. Once the polycarbodiimides precipitate and/or gel in the solvent, polymerization generally ceases such that the molecular weight of the polycarbodiimide does not increase. As such, polycarbodiimides produced via conventional methods have relatively low molecular weight, which significantly decreases potential applications in which the polycarbodiimides may be utilized in view of the physical properties obtainable from such polycarbodiimides. Specifically, the molecular weight of the polycarbodiimides impacts the physical properties of the polycarbodiimides.

In addition, because polycarbodiimides precipitate in conventional methods of producing polycarbodiimides, these polycarbodiimides cannot be stored, transported or processed in solution. Rather, the polycarbodiimides produced via conventional methods are processed in powder form. The powder form of the polycarbodiimides is generally obtained from isolating the polycarbodiimides that have precipitated and/or gelled in the solution. Such polycarbodiimides often have thermosetting properties when heated to a certain temperature (e.g. greater than 180° C.), which further limits applications in which the polycarbodiimides may be utilized.

SUMMARY OF THE INVENTION AND ADVANTAGES

The subject invention provides a high molecular weight polycarbodiimide and a method of producing the high molecular weight polycarbodiimide.

The method of producing the high molecular weight polycarbodiimide comprises the steps of providing an isocyanate component comprising toluene diisocyanate (TDI), a carbodiimidization catalyst, and a first solvent having a boiling point temperature of from about 50 to about 150° C. The method further comprises the step of polymerizing the isocyanate component for a first period of time in the first solvent and in the presence of the carbodiimidization catalyst to produce a reaction mixture including at least one carbodiimide compound and the first solvent. In addition, the method comprises the step of combining a second solvent, which is the same as or different from the first solvent, and the reaction mixture. Finally, the method comprises the step of polymerizing the at least one carbodiimide compound for a second period of time in the first and second solvents and in the presence of the carbodiimidization catalyst to produce the high molecular weight polycarbodiimide The high molecular weight polycarbodiimide has excellent physical properties and is suitable for diverse applications. In particular, the high molecular weight polycarbodiimide has physical properties typically characteristic of conventional performance plastics, such as polyamides, polyethersulfones, polyvinylchlorides, etc. As such, the high molecular weight polycarbodiimide of the present invention may be utilized in lieu of conventional performance plastics in various and diverse applications in view of its excellent physical properties, such as heat resistance and thermoplasticity. Moreover, the high molecular weight polycarbodiimide of the present invention may be manufactured for a fraction of the cost of conventional performance plastics.

DETAILED DESCRIPTION OF THE INVENTION

The present invention provides a high molecular weight polycarbodiimide and a method of producing the high molecular weight polycarbodiimide. The high molecular weight polycarbodiimide of the present invention has excellent physical properties and is suitable for use in diverse applications, as described in greater detail below. For example, the high molecular weight polycarbodiimide may be utilized in synthetic fiber applications, automotive applications, aerospace applications, and/or electronic applications. However, it is to be appreciated that the high molecular weight polycarbodiimide is not limited to such applications; for example, the high molecular weight polycarbodiimide of the present invention may be utilized in coating applications, etc.

The method of producing the high molecular weight polycarbodiimide comprises the step of providing an isocyanate component. The isocyanate component comprises toluene diisocyanate (TDI). The isocyanate component may comprise either isomer of toluene diisocyanate (TDI), i.e., the isocyanate component may comprise 2,4-toluene diisocyanate (2,4-TDI) or 2,6-toluene diisocyanate (2,6-TDI). Alternatively, the isocyanate component may comprise a blend of these isomers, i.e., the isocyanate component may comprise both 2,4-toluene diisocyanate (2,4-TDI) and 2,6-toluene diisocyanate (2,6-TDI). One specific example of a commercially available isocyanate component suitable for the purposes of the present invention is Lupranate® T-80, which is commercially available from BASF Corporation of Florham Park, N.J. Notably, Lupranate® T-80 comprises a blend of 2,4-toluene diisocyanate (2,4-TDI) and 2,6-toluene diisocyanate (2,6-TDI).

The method of producing the high molecular weight polycarbodiimide further comprises the step of providing a carbodiimidization catalyst. The carbodiimidization catalyst may be any type of carbodiimidization catalyst known to those skilled in the art for producing a polycarbodiimide Generally, the carbodiimidization catalyst is selected from the group of tertiary amides, basic metal compounds, carboxylic acid metal salts and/or non-basic organo-metallic compounds. In certain embodiments, the carbodiimidization catalyst comprises a phosphorus compound.

Specific examples of phosphorus compounds suitable for the purposes of the carbodiimidization catalyst include, but are not limited to, phospholene oxides such as 3-methyl-1-phenyl-2-phospholene oxide, 1-phenyl-2-phospholen-1-oxide, 3-methy-1-2-phospholen-1-oxide, 1-ethyl-2-phospholen-1-oxide, 3-methyl-1-phenyl-2-phospholen-1-oxide, and 3-phospholene isomers thereof. A particularly suitable phospholene oxide is 3-methyl-1-phenyl-2-phospholene oxide. For illustrative purposes only, 3-methyl-1-phenyl-2-phospholene oxide is represented by the following structure:

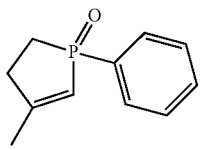

Additional examples of phosphorous compounds suitable for the purposes of the carbodiimidization catalyst include, but are not limited to, phosphates, diaza- and oxaza phospholenes and phosphorinanes. Specific examples of such phosphorous compounds include, but are not limited to, phosphate esters and other phosphates such as trimethyl phosphate, triethyl phosphate, tributyl phosphate, tri-2-ethylhexyl phosphate, tributoxyethyl phosphate, trioleyl phosphate, triphenyl phosphate, tricresyl phosphate, trixylenyl phosphate, cresyl diphenyl phosphate, xylenyl diphenyl phosphate, 2-ethylhexyldiphenyl phosphate, and the like; acidic phosphates such as methyl acid phosphate, ethyl acid phosphate, isopropyl acid phosphate, butyl acid phosphate, 2-ethylhexyl acid phosphate, isodecyl acid phosphate, lauryl acid phosphate, isotridecyl acid phosphate, myristyl acid phosphate, isostearyl acid phosphate, oleyl acid phosphate, and the like; tertiary phosphites such as triphenyl phosphite, tri(p-cresyl) phosphite, tris(nonylphenyl)phosphite, triisooctyl phosphite, diphenyisodecyl phosphite, phenyldiisodecyl phosphite, triisodecyl phosphite, tristearyl phosphite, trioleyl phosphite, and the like; secondary phosphites such as di-2-ethylhexyl hydrogen phosphite, dilauryl hydrogen phosphite, dioleyl hydrogen phosphite, and the like; and phosphine oxides, such as triethylphosphine oxide, tributylphosphine oxide, triphenylphosphine oxide, tris(chloromethyl)phosphine oxide, tris(chloromethyl)phosphine oxide, and the like. Carbodiimidization catalysts comprising phosphate esters and methods for their preparation are described in U.S. Pat. No. 3,056,835, which is hereby incorporated by reference in its entirety.

Yet further examples the carbodiimidization catalyst include, but are not limited to, 1-phenyl-3-methyl phospholene oxide, 1-benzyl-3-methyl phospholene oxide, 1-ethyl-3-methyl phospholene oxide, 1-phenyl-3-methyl phospholene dichloride, 1-benzyl-3-methyl phospholene dichloride, 1-ethyl-3-methyl phospholene dichloride, 1-phenyl-3-methyl phospholene sulphide, 1-phenyl-3-methyl phospholene sulphide, 1-benzyl-3-methyl phospholene sulphide, 1-ethyl-3-methyl phospholene sulphide, 1-phenyl-1-phenylimino-3-methyl phospholene oxide, 1-benzyl-1-phenylimino-3-methyl phospholene oxide 1-ethyl-1-phenylimino-3-methyl phospholene oxide, 1-phenyl phospholidine, 1-benzyl phospholidine, 1-ethyl phospholidine, and 1-phenyl-3-methyl phospholene oxide.

The carbodiimidization catalyst may alternatively comprise diaza and oxaza phospholenes and phosphorinanes. Diaza and oxaza phospholenes and phosphorinanes and methods for their preparation are described in U.S. Pat. No. 3,522,303, which is hereby incorporated by reference in its entirety. Specific diaza- and oxaza phospholenes and phosphorinanes include, but are not limited to, 2-ethyl-1,3-dimethyl-1,3,2-diazaphospholane-2-oxide; 2-chloromethyl-1,3-dimethyl-1,3,2-diazaphospholane-2-oxide; 2-trichloromethyl-1,3-dimethyl-1,3,2-diazaphospholane-2-oxide; 2-phenyl-1,3-dimethyl-1,3,2-diazaphospholane-2-oxide; 2-phenyl-1,3-dimethyl-1,3,2-diaza-phosphorinane-2-oxide; 2-benzyl-1,3-dimethyl-1,3,2-diazaphospholane-2-oxide; 2-allyl-1,3-dimethyl-1,3,2-diazaphospholane-2-oxide; 2-bromomethyl-1,3-dimethyl-1,3,2-diazaphospholane-2-oxide; 2-cyclohexyl-1,3-dimethyl-1,3,2-diazaphospholane-2-oxide; 2-cyclohexyl-1,3-dimethyl-1,3,2-diaphospholane-2-oxide; 2-(2-ethoxyethyl1,3-dimethyl-1,3,2-diazaphospholane-2-oxide; and 2-naphthyl-1,3-dimethyl-1,3,2-diazaphospholane-2-oxide, triethyl phosphate, hexamethyl phosphoramide, and the like.

The carbodiimidization catalyst may comprise a triaryl arsine. Triaryl arsines and methods for their preparation are described in U.S. Pat. No. 3,406,198, which is hereby incorporated by reference in its entirety. Specific examples of triaryl arsines include, but are not limited to, triphenylarsine, tris(p-tolyl)arsine, tris(p-methoxyphenyl)arsine, tris(p-ethoxyphenyl)arsine, tris(p-chlorophenyl)arsine, tris(p-fluorophenyl)arsine, tris(2,5-xylyl)arsine, tris(p-cyanophenyl)arsine, tris(1-naphthyl)arsine, tris(p-methylmercaptophenyl)arsine, tris(p-biphenylyl)arsine, p-chlorophenyl bis(ptolyl)arsine, phenyl(p-chlorophenyl)(p-bromophenyl)arsine, and the like. Additional arsine compounds are described in U.S. Pat. No. 4,143,063, which is hereby incorporated by reference in its entirety. Specific examples of such arsine compounds include, but are not limited to, triphenylarsine oxide, triethylarsine oxide, polymer bound arsine oxide, and the like.

Further, the carbodiimidization catalyst may comprise metallic derivatives of acetlyacetone. Metallic derivatives of acetlyacetone and methods are described in U.S. Pat. No. 3,152,131, which is hereby incorporated by reference in its entirety. Specific examples of metallic derivatives of acetlyacetone include, but are not limited to, metallic derivatives of acetylacetone such as the beryllium, aluminum, zirconium, chromium, and iron derivatives.

Additional examples of the carbodiimidization catalyst include metal complexes derived from a d-group transition element and π-bonding ligand selected from the group consisting of carbon monoxide, nitric oxide, hydrocarbylisocyanides, trihydrocarbylphosphine, trihydfrocarbylarsine, trihydrocarbylstilbine, and dihydrocarbylsulfide wherein hydrocarbyl in each instance contains from 1 to 12 carbon atoms, inclusive, provided that at least one of the π-bonding ligands in the complex is carbon monoxide or hydrocarbylisocyanide. Such metal complexes and methods for preparation are described in U.S. Pat. No. 3,406,197, which is hereby incorporated by reference in its entirety. Specific examples of metal complexes include, but are not limited to, iron pentacarbonyl, di-iron pentacarbonyl, tungsten hexacarbonyl, molybdenum hexacarbonyl, chromium hexacarbonyl, dimanganese decacarbonyl, nickel tetracarbonyl, ruthenium pentacarbonyl, the complex of iron tetracarbonyl:methylisocyanide, and the like.

The carbodiimidization catalyst may comprise organotin compounds. Specific examples of organotin compounds include, but are not limited to, dibutytin dilaurate, dibutyltin diacetate, dibutyltin di(2-ethylhexanoate), dioctyltin dilaurate, dibutylin maleate, di(n-octyl)tin maleate, bis(dibutylacetoxytin)oxide, bis(dibutyllauroyloxytin)oxide, dibutyltin dibutoxide, dibutyltin dimethoxide, dibutyltin disalicilate, dibutyltin bis(isooctylmaleate), dibutyltin bis(isopropylmaleate), dibutyltin oxide, tributyltin acetate, tributyltin isopropyl succinate, tributyltin linoleate, tributyltin nicotinate, dimethyltin dilaurate, dimethyltin oxide, diotyltin oxide, bis(tributyltin)oxide, diphenyltin oxide, triphenyltin acetate, tri-n-propyltin acetate, tri-n-propyltin laurate and bis(tri-n-propyltin)oxide, dibutyltin dilauryl mercaptide, dibutyltin bis(isooctylmercaptoacetate),bis(triphenyltin)oxide, stannous oxalate, stannous oleate, stannous naphthenate, stannous acetate, stannous butyrate, stannous 2-ethylhexanoate, stannous laurate, stannous palmitate, stannous stearate, and the like. Typical organotin compounds include, but are not limited to, stannous oxalate, stannous oleate and stannous 2-ethylhexanoate, dibutyltin diacetate, dibutyltin dilaurate, dibutyltin dilaurylmercaptide, dibutyltin bis(isooctylmercaptoacetate), dibutyltin oxide, bis(triphenyltin) oxide, and bis(tri-n-butyltin)oxide.

Further, the carbodiimidization catalyst may comprise various organic and metal carbene complexes, titanium(IV) complexes, copper(I) and/or copper(II) complexes.

The method of producing the high molecular weight polycarbodiimide also comprises the step of providing a first solvent having a boiling point temperature of from about 50 to about 150° C. The first solvent typically has a boiling point temperature of from about 75 to about 125, more typically from about 90 to about 120° C. In certain embodiments, the first solvent comprises an aromatic arene solvent. One example of an aromatic arene solvent particularly suitable for the method is toluene, which has a boiling point temperature of about 110° C. at atmospheric pressure. Another example of an aromatic arene solvent is xylene. As readily understood in the art, other solvents having a boiling point temperature of from about 50 to about 150° C. may be utilized as the first solvent, including aromatic arene solvents other than toluene and xylene.

The method of producing the high molecular weight polycarbodiimide additionally comprises the step of polymerizing the isocyanate component for a first period of time in the first solvent and in the presence of the carbodiimidization catalyst to produce a reaction mixture including at least one carbodiimide compound and the first solvent. Typically, the reaction mixture also comprises the carbodiimidization catalyst.

The first period of time during which the isocyanate component is polymerized is generally sufficient for the reaction mixture to precipitate, gel, and/or become turbid. For example, a combination of the isocyanate component, the carbodiimidization catalyst and the first solvent is typically a transparent (i.e., optically clear) liquid having a yellow hue. However, the first period of time is sufficient for the reaction mixture to precipitate, gel, and/or become turbid. Generally, turbidity of the reaction mixture increases with time, i.e., turbidity and time are directly proportional. Said differently, the reaction mixture typically becomes more turbid as time progresses during the step of polymerizing the isocyanate component. The reaction mixture may have various degrees of turbidity without departing from the scope of the present invention. Similarly, the first period of time is not limited to the period of time necessary for the reaction mixture to become slightly turbid. Rather, the first period of time may extend beyond the period of time necessary for the reaction mixture to become slightly turbid. Said differently, the first period of time may be selected such that the step of polymerizing the isocyanate component is carried out even after the reaction mixture precipitates, gels, and/or becomes turbid without departing from the scope of the present invention.

Typically, the first period of time during which the isocyanate component is polymerized is from about 120 to about 420, typically from about 180 to about 360, more typically from about 200 to about 340, most typically from about 240 to about 300 minutes. As introduced above, the reaction mixture may begin to become turbid after, for example, 60 minutes, yet the first period of time typically extends beyond the time at which the reaction mixture begins to become turbid.

The step of polymerizing the isocyanate component is typically carried out above room temperature. In particular, the step of polymerizing the isocyanate component is typically carried at a temperature greater than about 80, typically greater than about 90, more typically greater than about 95, most typically from about 100 to about 110° C. When the first solvent comprises toluene, the step of polymerizing the isocyanate component is typically carried at the boiling point temperature of the first solvent.

As introduced above, the step of polymerizing the isocyanate component in the first solvent and in the presence of the carbodiimidization catalyst produces a reaction mixture including at least one carbodiimide compound. For purposes of clarity, the at least one carbodiimide compound is referred to herein as "the carbodiimide compound," which is to be understood to encompass a variety of carbodiimide compounds which may be simultaneously or alternatively produced via the step of polymerizing the isocyanate component in the first solvent and in the presence of the carbodiimidization catalyst. The carbodiimide compound may be monomeric, oligomeric, or polymeric. Further, the step of polymerizing the isocyanate component in the first solvent and in the presence of the carbodiimidization catalyst may produce a reaction mixture including combinations of carbodiimide compounds which may independently be monomeric, oligomeric, or polymeric.

The carbodiimide compound formed from the step of polymerizing the isocyanate component typically has a number average molecular weight of from about 1,000 to about 10,000, more typically from about 2,000 to about 8,000, most typically from about 3,000 to about 8,000. In addition, the carbodiimide compound typically forms a white solid in the reaction mixture when the carbodiimide compound has the molecular weight set forth above.

The step of polymerizing the isocyanate component is typically carried out in an inert atmosphere, i.e., an atmosphere substantially free from oxygen. Any inert atmosphere known in the art may be utilized during the step of polymerizing the isocyanate component. Typically, the inert atmosphere comprises an inert gas, such as nitrogen, argon, helium, and carbon dioxide, etc.

As readily understood in the art, carbon dioxide gas is released during the step of polymerizing the isocyanate component. Specifically, carbon dioxide is a by-product formed when —N=C=O groups present in the isocyanate component react with one another to form —N=C=N— linkages.

A reaction mechanism illustrative of the polymerization of the isocyanate component is set forth below. In the reaction mechanism below, the isocyanate component comprises 2,4-toluene diisocyanate (2,4-TDI) and 2,6-toluene diisocyanate (2,6-TDI), which are reacted in the presence of a carbodiimidization catalyst to produce various polycarbodiimides. In the polycarbodiimides of the reaction mechanism below, n is an integer dependent upon the molecular weight of the particular polycarbodiimide than the first solvent, the second solvent typically has a boiling point temperature less than 90° C., i.e., less than the boiling point temperature of toluene.

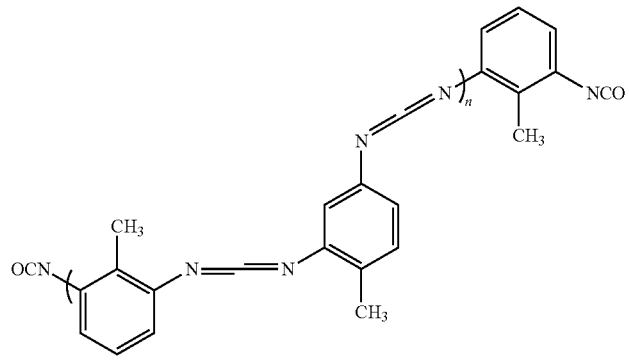

The method of producing the high molecular weight polycarbodiimide further comprises the step of combining a second solvent, which is the same as or different from the first solvent, and the reaction mixture. In certain embodiments, the method further comprises the step of combining an additional amount of the carbodiimidization catalyst, the second solvent, and the reaction mixture. In these embodiments, the second solvent and the carbodiimidization catalyst may be introduced into the reaction mixture separately, i.e., discretely, or simultaneously. When introduced separately, either the second solvent or the additional amount of the carbodiimidization catalyst may be first introduced into the reaction mixture. Alternatively, the reaction mixture may be introduced into the second solvent and the additional amount of the carbodiimidization catalyst, or the reaction mixture may be introduced into the second solvent individually or the additional amount of the carbodiimidization catalyst individually.

In certain embodiments, the first and second solvents are the same. For example, the first and second solvents may comprise toluene. In other embodiments, the second solvent is different from the first solvent.

In embodiments in which the second solvent is different from the first solvent, the second solvent typically has a boiling point temperature less than the boiling point temperature of the first solvent. For example, when the first solvent comprises toluene, and when the second solvent is different In certain embodiments when the second solvent is different from the first solvent, the second solvent comprises a cyclic ether. For example, the second solvent may comprise tetrahydrofuran (THF). As understood in the art, tetrahydrofuran (THF) is a cyclic ether having a boiling point temperature of about 66° C. For illustrative purposes only, the structure of tetrahydrofuran (THF) is set forth immediately below:

In other embodiments in which the second solvent is different from the first solvent, the second solvent comprises a polar solvent other than tetrahydrofuran (THF). For example, one example of a polar solvent suitable for the purposes of the second solvent of the method is dimethyl sulfoxide (DMSO).

The second solvent is typically employed in an amount that is less than an amount of the first solvent utilized during the step of polymerizing the isocyanate component. In particular, the second solvent is typically utilized in an amount of from about 15 to about 75, more typically from about 25 to about 70, most typically from about 40 to about 60 percent by weight relative to the total amount of the first solvent present in the reaction mixture.

As introduced above, the carbodiimide compound formed during the step of polymerizing the isocyanate compound in the first solvent and in the presence of the carbodiimidization catalyst for the first period of time is typically a solid. Said differently, the carbodiimide compound typically precipitates and/or gels in the reaction mixture such that the carbodiimide compound is not solubilized by the first solvent. Generally, once the carbodiimide compound precipitates and/or gels in the reaction mixture, polymerization of the isocyanate component ceases such that the molecular weight of the carbodiimide compound no longer increases. However, in certain embodiments, the second solvent is capable of solubilizing the carbodiimide compound. As such, in these embodiments, during the step of combining the second solvent and the reaction mixture, the carbodiimide compound which is present in the reaction mixture is solubilized by the second solvent such that a combination of the second solvent and the reaction mixture is a liquid.

When the method comprises the step of combining the additional amount of the carbodiimidization catalyst, the reaction mixture, and the second solvent, the additional amount of the carbodiimidization catalyst utilized is typically less than an amount of the carbodiimidization catalyst utilized during the step of polymerizing the isocyanate component in the first solvent. Alternatively, the additional amount of the carbodiimidization catalyst utilized may be more than the amount of the carbodiimidization catalyst utilized during the step of polymerizing the isocyanate component in the first solvent. It is to be appreciated that the additional amount of the carbodiimidization catalyst may vary dependent upon various and relative amounts of other components, such as the isocyanate component, the second solvent, etc. The additional amount of the carbodiimidization catalyst may comprise the same carbodiimidization catalyst as utilized during the step of polymerizing the isocyanate component or may be independently selected from the carbodiimidization catalysts set forth above.

In certain embodiments, the reaction mixture is cooled to about room temperature prior to combining the second solvent and the reaction mixture. Alternatively, the reaction mixture may be combined with the second solvent at a temperature other than room temperature, e.g. at a temperature between room temperature and about 110° C. Generally, the reaction mixture is cooled to about room temperature prior to combining the second solvent and the reaction mixture. This is particularly typical when the reaction mixture is produced at the boiling point temperature of the first solvent and when the second solvent has a boiling point temperature less than the boiling temperature of the first solvent because it is undesirable to introduce the second solvent to a temperature above its boiling point temperature.

The method of producing the high molecular weight polycarbodiimide also comprises the step of polymerizing the carbodiimide compound for a second period of time in the first and second solvents and in the presence of the carbodiimidization catalyst to produce the high molecular weight polycarbodiimide.

Typically, the second period of time during which the carbodiimide compound is polymerized is great than about 100 minutes. In particular, the second period of time during which the carbodiimide compound is polymerized is typically from about 100 to about 200, more typically from about 120 to about 180, most typically from about 140 to about 160 minutes. It is to be appreciated that the second period of time may deviate from the ranges set forth above contingent upon the desired molecular weight of the high molecular weight polycarbodiimide without departing from the scope of the present invention. For example, in certain applications in which the molecular weight of the high molecular weight polycarbodiimide is not particularly critical, the second period of time may be less than 100 minutes. Alternatively, the second period of time may exceed 200 minutes.

The step of polymerizing the carbodiimide compound is typically carried out above room temperature. In particular, the step of polymerizing the carbodiimide compound is typically carried at a temperature greater than about 60, typically greater than about 70, more typically greater than about 80, most typically from about 85 to about 95° C. In certain embodiments, the step of polymerizing the carbodiimide compound is typically carried at the boiling point temperature of a combination of the first and second solvents. It is to be appreciated that the temperature at which the carbodiimide compound is polymerized is contingent on the particular first and second solvents utilized and the relative amounts thereof. As such, the temperature at which the carbodiimide compound is polymerized may deviate from the ranges set forth above without departing form the scope of the present invention.

As described above, the second solvent typically solubilizes the carbodiimide compound such that the carbodiimide compound may continue to polymerize with any other carbodiimide compounds and/or with residual isocyanate component.

The step of polymerizing the carbodiimide compound to produce the high molecular weight polycarbodiimide is typically carried out in an inert atmosphere, i.e., an atmosphere substantially free from oxygen. Any inert atmosphere known in the art may be utilized during the step of polymerizing the carbodiimide compound. The inert atmosphere may be the same as or different from the inert atmosphere utilized during the step of polymerizing the isocyanate component. Typically, the inert atmosphere comprises an inert gas, such as nitrogen, argon, helium, and carbon dioxide, etc.

As described above with respect to the step of polymerizing the isocyanate component, carbon dioxide gas may also be released during the step of polymerizing the carbodiimide compound.

In various embodiments, the method of producing the high molecular weight polycarbodiimide additionally comprises the step of isolating the high molecular weight polycarbodiimide. For example, after the second period of time during which the high molecular weight polycarbodiimide is produced, the high molecular weight polycarbodiimide may be precipitated in an organic solvent which is not capable of solubilizing the high molecular weight polycarbodiimide. Examples of organic solvents include, but are not limited to: hydrocarbon solvents, such as hexane, heptane, etc.; alcohols, such as methanol; and ketones, such as acetone. These organic solvents do not solubilize the high molecular weight polycarbodiimide such that the high molecular weight polycarbodiimide precipitates in these organic solvents. Typically, when the high molecular weight polycarbodiimide precipitates in the organic solvent which is not capable of solubilizing the high molecular weight polycarbodiimide, the high molecular weight polycarbodiimide has a stringy white appearance.

When the high molecular weight polycarbodiimide is isolated from the first and second solvents and the carbodiimidization catalyst, the high molecular weight polycarbodiimide may be dried to form a solid material which may subsequently be processed for various applications. For example, the high molecular weight polycarbodiimide may be processed for extrusion, molding, film blowing, fiber spinning, spin coating, etc. Alternatively, when the high molecular weight polycarbodiimide is isolated from the first and second solvents and the carbodiimidization catalyst, the high molecular weight polycarbodiimide may be solubilized in a suitable solvent, such as tetrahydrofuran (THF). Because of the molecular weight of the high molecular weight polycarbodiimide, few solvents are capable of solubilizing the high molecular weight polycarbodiimide. Once solubilized in the suitable solvent, the high molecular weight polycarbodiimide may be transported, stored, or processed as a solution. The solution may be cast to form a polycarbodiimide film, or may be utilized to form polycarbodiimide fibers, which may be pulled from the solution, etc.

The high molecular weight polycarbodiimide compound formed via the method of the present invention typically has a weight average molecular weight that cannot be measured via traditional techniques, such as a refractive index detector. Generally, weight average molecular weight of a polymer cannot be measured via a refractive index detector if a mole fraction of the polymer has a molecular weight exceeding 1,000,000. As such, the number and weight average molecular weight of the high molecular weight polycarbodiimide referenced herein are generally measured via an evaporative light scattering detector (ELSD) unless specifically stated otherwise. The high molecular weight polycarbodiimide produced in accordance with the method of the present invention has a mole fraction greater than 0 having a weight average molecular weight of at least about 100,000, more typically at least about 250,000, most typically at least about 500,000, as measured via the evaporative light scattering detector (ELSD). In certain embodiments, the high molecular weight polycarbodiimide has a mole fraction greater than 0 having a weight average molecular weight of at least about 1,000,000. Conversely, conventional methods of producing polycarbodiimides do not achieve any mole fraction having a weight average molecular weight exceeding 100,000.

More specifically, when the first solvent comprises toluene, the second solvent comprises tetrahydrofuran (THF), and the additional amount of the carbodiimidization catalyst is utilized, the high molecular weight polycarbodiimide typically has a mole fraction greater than 20, more typically greater than 25, most typically greater than 30 having a weight average molecular weight of at least about 100,000. In this embodiment, the high molecular weight polycarbodiimide typically has a mole fraction typically greater than 5, more typically greater than 10, most typically greater than 15 having a weight average molecular weight of at least about 250,000. Further, in this embodiment, the high molecular weight polycarbodiimide typically has a mole fraction typically greater than 5, more typically greater than 7.5, most typically greater than 10 having a weight average molecular weight of at least about 500,000. Additionally, in this embodiment, the high molecular weight polycarbodiimide typically has a mole fraction typically greater than 1, more typically greater than 2, most typically greater than 3 having a weight average molecular weight of at least about 1,000,000.

In an alternative embodiment in which the first and second solvents each comprise toluene, and when the additional amount of the carbodiimidization catalyst is not utilized, the high molecular weight polycarbodiimide typically has a mole fraction greater than 1, more typically greater than 2, most typically greater than 3 having a weight average molecular weight of at least about 100,000. In this embodiment, the high molecular weight polycarbodiimide typically has a mole fraction typically greater than 0.1, more typically greater than 0.2, most typically greater than 0.3 having a weight average molecular weight of at least about 250,000. The high molecular weight polycarbodiimide produced in accordance with the method of the present invention has excellent physical properties. In fact, the high molecular weight polycarbodiimide has physical properties that are generally characteristic of performance polymers, such as polyethersulfones, polyetheretherketones, polyimides, polyamides, polyalkylene terephthalates, etc. Additionally, the high molecular weight polycarbodiimide generally has thermoplastic properties.

For example, the high molecular weight polycarbodiimide typically has a tensile strength of up to about $14.7 \times 10^3$ psi, as measured in accordance with DIN 53504 S2. More particularly, the high molecular weight polycarbodiimide typically has a tensile strength of from about $3.9 \times 10^3$ to about $14.7 \times 10^3$ psi, as measured in accordance with DIN 53504 S2. Heat treating the high molecular weight polycarbodiimide influences the tensile strength of the high molecular weight polycarbodiimide. For example, heat treating the high molecular weight polycarbodiimide at a temperature of about 220° C. for about 10 minutes generally imparts the high molecular weight polycarbodiimide with a tensile strength at the upper portion of the range set forth above, i.e., up to about $14.7 \times 10^3$ psi, as measured in accordance with DIN 53504 S2. In contrast, heat treating the high molecular weight polycarbodiimide at a temperature of about 100° C. for about 10 minutes generally imparts the high molecular weight polycarbodiimide with a tensile strength at the lower portion of the range set forth above, i.e., greater than about $3.9 \times 10^3$ psi, as measured in accordance with DIN 53504 S2. The high molecular weight polycarbodiimide also typically has an elongation at break of from about 5.8 to about 184.4, more typically from about 20 to about 170, percent (%), as measured in accordance with DIN 53504 S2. Notably, like the tensile strength, heat treating the high molecular weight polycarbodiimide influences the elongation at break of the high molecular weight polycarbodiimide. For example, heat treating the high molecular weight polycarbodiimide at a temperature of about 220° C. for about 10 minutes generally imparts the high molecular weight polycarbodiimide with elongation at break at the upper portion of the range set forth above, i.e., up to about 184.4 percent, as measured in accordance with DIN 53504 S2. In contrast, heat treating the high molecular weight polycarbodiimide at a temperature of about 100° C. for about 10 minutes generally imparts the high molecular weight polycarbodiimide with an elongation at break at the lower portion of the range set forth above, i.e., greater than about 5.8 percent, as measured in accordance with DIN 53504 S2. Further, the high molecular weight polycarbodiimide typically has a glass transition temperature of from about 50 to about 155° C. However, heat treating the high molecular weight polycarbodiimide at a temperature of about 220° C. for about 10 minutes generally imparts the high molecular weight polycarbodiimide with a glass transition temperature of from about 120 to about 155, more typically from about 125 to about 145, most typically from about 130 to about 145° C. The high molecular weight polycarbodiimide typically has a melting temperature of greater than about 200° C., most typically from about 200 to about 230° C. The high molecular weight polycarbodiimide has a Shore D hardness of from about 80 to about 90, more typically from about 82 to about 88, most typically from about 83 to about 85. In addition, the high molecular weight polycarbodiimide has a decomposition temperature which is onset at about 467° C.

In view of the excellent physical properties of the high molecular weight polycarbodiimide produced via the method of the present invention, the high molecular weight polycarbodiimide may be utilized in various and diverse industries. For example, the high molecular weight polycarbodiimide may be utilized in electrical and electronic packaging applications. Examples of electrical and electronic packaging applications in which the high molecular weight polycarbodiimide may be utilized include wire and cable tapes; insulation for coils, magnet wire, transformers, and capacitors; substrates for flexible printed circuits; films for photovoltaic cells; and magnetic and pressure-sensitive tapes. The high molecular weight polycarbodiimide may also be utilized in synthetic fiber applications. Additionally, the high molecular weight polycarbodiimide may be utilized in the automotive and aerospace industry. For example, the high molecular weight polycarbodiimide may be utilized in under-the-hood applications in view of its excellent heat resistance. Similarly, the high molecular weight polycarbodiimide may be utilized in o-ring seals and gaskets, or may be utilized in fuel lines.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention.

EXAMPLES

The following Isocyanate Components are referenced throughout the Examples as Isocyanate Components 1-4:
Isocyanate Component 1 is toluene diisocyanate (TDI);
Isocyanate Component 2 is methylene diphenyl diisocyanate (MDI);
Isocyanate Component 3 is isophorone diisocyanate (IPDI); and
Isocyanate Component 4 is naphthalene diisocyanate (NDI).

The following First Solvents are referenced throughout the Examples as First Solvents 1-5:
First Solvent 1 is toluene;
First Solvent 2 is tetrahydrofuran (THF);
First Solvent 3 is xylene;
First Solvent 4 is tetrachloroethylene; and
First Solvent 5 is chlorobenzene.

The following Second Solvents are referenced throughout the Examples as Second Solvents 1 and 2:
Second Solvent 1 is toluene; and
Second Solvent 2 is tetrahydrofuran (THF).

The Carbodiimidization Catalyst referenced throughout the Examples is 3-methyl-1-phenyl-2-phospholene-1-oxide.

Example 1

64.8 grams of Isocyanate Component 1, 0.144 grams of the Carbodiimidization Catalyst and 550 mL of the First Solvent 1 are disposed in a three neck round bottom flask equipped with a magnetic stirrer and a condenser to form a mixture. The mixture is heated to about 110° C., i.e., the boiling point temperature of the First Solvent 1, in 15-20 minutes under a static nitrogen atmosphere. The mixture is held at 110° C. under a static nitrogen atmosphere for about four hours, during which carbon dioxide ($CO_2$) is released from the mixture. The mixture is initially a clear yellow liquid, but the mixture becomes turbid after about four hours while being held at about 110° C. under a static nitrogen atmosphere. The mixture becomes more turbid with time, i.e., the mixtures becomes more turbid between the third and fourth hour during which the mixture is held at about 110° C. under a static nitrogen atmosphere. After about four hours, at least one carbodiimide compound is formed in the mixture. The at least one carbodiimide compound is a clear solid precipitate in the bottom of the flask. The flask and its contents are cooled to room temperature. 250 mL of the Second Solvent 2 and an additional 0.1 grams of the Carbodiimidization Catalyst are disposed in the flask. The at least one carbodiimide compound dissolves instantly. The flask and its contents are heated to about 94° C., i.e., the boiling point temperature of a combination of the First Solvent 1 and the Second Solvent 2, under a static nitrogen atmosphere for about two hours to form a high molecular weight polycarbodiimide. The high molecular weight polycarbodiimide is precipitated in hexane and dried in an oven for about 2 hours at about 70° C.

Example 2

64.8 grams of Isocyanate Component 1, 0.144 grams of the Carbodiimidization Catalyst and 550 mL of the First Solvent 2 are disposed in a three neck round bottom flask equipped with a magnetic stirrer and a condenser to form a mixture. The mixture is heated to about 66° C., i.e., the boiling point temperature of the First Solvent 2, in 15-20 minutes under a static nitrogen atmosphere. The mixture is held at 66° C. under a static nitrogen atmosphere for about four hours, during which carbon dioxide ($CO_2$) is released from the mixture. The mixture is initially a clear yellow liquid, but the mixture becomes turbid after about four hours while being held at about 66° C. under a static nitrogen atmosphere. The mixture becomes more turbid with time, i.e., the mixtures becomes more turbid between the third and fourth hour during which the mixture is held at about 66° C. under a static nitrogen atmosphere. After about four hours, at least one carbodiimide compound is formed in the mixture. The flask and its contents are cooled to room temperature. 250 mL of the Second Solvent 1 is disposed in the flask. The flask and its contents are heated to about 85° C., i.e., the boiling point temperature of a combination of the First Solvent 2 and the Second Solvent 1, under a static nitrogen atmosphere for about two hours to form a polycarbodiimide. The polycarbodiimide is removed from the bottom of the flask, diluted in THF, and analyzed, as described in greater detail below.

Example 3

64.8 grams of Isocyanate Component 1, 0.144 grams of the Carbodiimidization Catalyst and 550 mL of the First Solvent 1 are disposed in a three neck round bottom flask equipped with a magnetic stirrer and a condenser to form a mixture. The mixture is heated to about 110° C., i.e., the boiling point temperature of the First Solvent 1, in 15-20 minutes under a static nitrogen atmosphere. The mixture is held at 110° C. under a static nitrogen atmosphere for about four hours, during which carbon dioxide ($CO_2$) is released from the mixture. The mixture is initially a clear yellow liquid, but the mixture becomes turbid after about four hours while being held at about 110° C. under a static nitrogen atmosphere. The mixture becomes more turbid with time, i.e., the mixtures becomes more turbid between the third and fourth hour during which the mixture is held at about 110° C. under a static nitrogen atmosphere. After about four hours, at least one carbodiimide compound is formed in the mixture. The flask and its contents are cooled to room temperature. 250 mL of the Second Solvent 1 is disposed in the flask. The flask and its contents are heated to about 110° C., i.e., the boiling point temperature the First Solvent 1 and the Second Solvent 1, under a static nitrogen atmosphere for about two hours to form a polycarbodiimide. The polycarbodiimide is removed from the bottom of the flask, diluted in THF, and analyzed, as described in greater detail below.

Example 4

64.8 grams of Isocyanate Component 1, 0.144 grams of the Carbodiimidization Catalyst and 550 mL of the First Solvent 2 are disposed in a three neck round bottom flask equipped with a magnetic stirrer and a condenser to form a mixture. The mixture is heated to about 66° C., i.e., the boiling point temperature of the First Solvent 2, in 15-20 minutes under a static nitrogen atmosphere. The mixture is held at 66° C. under a static nitrogen atmosphere for about four hours, during which carbon dioxide ($CO_2$) is released from the mixture. After about four hours, at least one carbodiimide compound is formed in the mixture. The flask and its contents are cooled to room temperature. 250 mL of the Second Solvent 2 is disposed in the flask. The flask and its contents are heated to about 66° C., i.e., the boiling point temperature the First Solvent 2 and the Second Solvent 2, under a static nitrogen atmosphere for about two hours to form a polycarbodiimide The polycarbodiimide is removed from the bottom of the flask, diluted in THF, and analyzed, as described in greater detail below.

Example 5

64.8 grams of Isocyanate Component 1, 0.144 grams of the Carbodiimidization Catalyst and 550 mL of the First Solvent 3 are disposed in a three neck round bottom flask equipped with a magnetic stirrer and a condenser to form a mixture. The mixture is heated to about 110° C. in 15-20 minutes under a static nitrogen atmosphere. The mixture is held at 110° C. under a static nitrogen atmosphere for about four hours, during which carbon dioxide ($CO_2$) is released from the mixture. After about five hours, at least one carbodiimide compound is formed in the mixture. The flask and its contents are cooled to room temperature. 250 mL of the Second Solvent 2 is disposed in the flask. The flask and its contents are heated to about 110° C. under a static nitrogen atmosphere for about two hours to form a polycarbodiimide. The polycarbodiimide is removed from the bottom of the flask, diluted in THF, and analyzed, as described in greater detail below.

Example 6

64.8 grams of Isocyanate Component 1, 0.144 grams of the Carbodiimidization Catalyst and 800 mL of the First Solvent 3 are disposed in a three neck round bottom flask equipped with a magnetic stirrer and a condenser to form a mixture. The mixture is heated to about 110° C. in 15-20 minutes under a static nitrogen atmosphere. The mixture is held at 110° C. under a static nitrogen atmosphere. However, after about one hour, at least one carbodiimide compound is formed in the mixture, which precipitated in the mixture. 250 mL of the Second Solvent 2 and an additional 0.1 grams of the Carbodiimidization Catalyst are disposed in the flask. The at least one carbodiimide compound dissolves instantly. The flask and its contents are heated to about 85° C., i.e., the boiling point temperature of a combination of the First Solvent 3 and the Second Solvent 2, under a static nitrogen atmosphere for about two hours to form a high molecular weight polycarbodiimide. The high molecular weight polycarbodiimide is precipitated in hexane and dried in an oven for about 2 hours at about 70° C.

Comparative Example 1

64.8 grams of Isocyanate Component 1, 0.144 grams of the Carbodiimidization Catalyst and 800 mL of the First Solvent 1 are disposed in a three neck round bottom flask equipped with a magnetic stirrer and a condenser to form a mixture. The mixture is heated to about 110° C., i.e., the boiling point temperature of the First Solvent 1, in 15-20 minutes under a static nitrogen atmosphere. The mixture is held at 110° C. under a static nitrogen atmosphere for about six hours, during which carbon dioxide ($CO_2$) is released from the mixture. The mixture is initially a clear yellow liquid, but the mixture becomes turbid after about four hours while being held at about 110° C. under a static nitrogen atmosphere. The mixture becomes more turbid with time, i.e., the mixtures becomes more turbid between the fifth and sixth hour during which the mixture is held at about 110° C. under a static nitrogen atmosphere. After about six hours, at least one carbodiimide compound is formed in the mixture. The at least one carbodiimide compound is a clear solid precipitate in the bottom of the flask. The at least one carbodiimide compound is removed from the bottom of the flask, diluted in THF, and analyzed, as described in greater detail below.

Comparative Example 2

64.8 grams of Isocyanate Component 1, 0.144 grams of the Carbodiimidization Catalyst and 550 mL of the First Solvent 2 are disposed in a three neck round bottom flask equipped with a magnetic stirrer and a condenser to form a mixture. The mixture is heated to about 66° C., i.e., the boiling point temperature of the First Solvent 2, in 15-20 minutes under a static nitrogen atmosphere. The mixture is held at 66° C. under a static nitrogen atmosphere for about six hours, during which carbon dioxide ($CO_2$) is released from the mixture. The mixture is initially a clear yellow liquid, but the mixture becomes turbid after about four hours while being held at about 66° C. under a static nitrogen atmosphere. The mixture becomes more turbid with time, i.e., the mixtures becomes more turbid between the fifth and sixth hour during which the mixture is held at about 66° C. under a static nitrogen atmosphere. After about six hours, at least one carbodiimide compound is formed in the mixture. The at least one carbodiimide compound is a clear solid precipitate in the bottom of the flask. The at least one carbodiimide compound is removed from the bottom of the flask, diluted in THF, and analyzed, as described in greater detail below.

Comparative Example 3

64.8 grams of Isocyanate Component 1, 0.144 grams of the Carbodiimidization Catalyst, 550 mL of the First Solvent 1 and 250 mL of the Second Solvent 2 are disposed in a three neck round bottom flask equipped with a magnetic stirrer and a condenser to form a mixture. The mixture is heated to about 85° C., i.e., the boiling point temperature of a combination of the First Solvent 1 and the Second Solvent 2, in 15-20 minutes under a static nitrogen atmosphere. The mixture is held at 85° C. under a static nitrogen atmosphere for about six hours, during which carbon dioxide ($CO_2$) is released from the mixture. The mixture is initially a clear yellow liquid, but the mixture becomes turbid after about four hours while being held at about 85° C. under a static nitrogen atmosphere. The mixture becomes more turbid with time, i.e., the mixtures becomes more turbid between the fifth and six hour during which the mixture is held at about 85° C. under a static nitrogen atmosphere. After about six hours, at least one carbodiimide compound is formed in the mixture. The at least one carbodiimide compound is removed from the bottom of the flask, diluted in THF, and analyzed, as described in greater detail below.

Comparative Example 4

93.09 grams of Isocyanate Component 2, 0.144 grams of the Carbodiimidization Catalyst and 800 mL of the First Solvent 1 are disposed in a three neck round bottom flask equipped with a magnetic stirrer and a condenser to form a mixture. The mixture is heated to about 110° C., i.e., the boiling point temperature of the First Solvent 1, in 15-20 minutes under a static nitrogen atmosphere. The mixture is held at 110° C. under a static nitrogen atmosphere. However, after about one hour, at least one carbodiimide compound is formed in the mixture, which precipitated in the mixture. 250 mL of the Second Solvent 2 is disposed in the flask. The flask and its contents are heated to about 85° C. under a static nitrogen atmosphere. However, the at least one carbodiimide compound remains precipitated in the flask despite the addition of the Second Solvent 2 and did not polymerize further.

Comparative Example 5

10.8 grams of Isocyanate Component 1, 0.026 grams of the Carbodiimidization Catalyst and 100 mL of the First Solvent 4 are disposed in a round bottom flask to form a mixture. The mixture is heated to about 120° C. under a static nitrogen atmosphere and is held at this temperature for about four hours to produce a polycarbodiimide. The polycarbodiimide is removed from the bottom of the flask, diluted in THF, and analyzed, as described in greater detail below.

Comparative Example 6

5.4 grams of Isocyanate Component 1, 0.012 grams of the Carbodiimidization Catalyst and 50 mL of the First Solvent 5 are disposed in a round bottom flask to form a mixture. The mixture is heated to about 130° C. under a static nitrogen atmosphere and is held at this temperature for about four hours to produce a polycarbodiimide. The polycarbodiimide is removed from the bottom of the flask, diluted in THF, and analyzed, as described in greater detail below.

Comparative Example 7

82.69 grams of Isocyanate Component 3, 0.144 grams of the Carbodiimidization Catalyst and 550 mL of the First Solvent 1 are disposed in a three neck round bottom flask equipped with a magnetic stirrer and a condenser to form a mixture. The mixture is heated to about 110° C., i.e., the boiling point temperature of the First Solvent 1, in 15-20 minutes under a static nitrogen atmosphere. The mixture is held at 110° C. under a static nitrogen atmosphere for about four hours. After about four hours, 250 mL of the Second Solvent 2 is disposed in the flask. The flask and its contents are heated to about 94° C., i.e., the boiling point temperature of a combination of the First Solvent 1 and the Second Solvent 2, under a static nitrogen atmosphere for about two hours. The Isocyanate Component 3 did not polymerize and no high molecular weight polycarbodiimide was formed.

Comparative Example 8

78.9 grams of Isocyanate Component 4, 0.144 grams of the Carbodiimidization Catalyst and 550 mL of the First Solvent 1 are disposed in a three neck round bottom flask equipped with a magnetic stirrer and a condenser to form a mixture. The mixture is heated to about 110° C., i.e., the boiling point temperature of the First Solvent 1, in 15-20 minutes under a static nitrogen atmosphere. The mixture is held at 110° C. under a static nitrogen atmosphere. However, after about 20 minutes, at least one carbodiimide compound is formed in the mixture, which precipitated in the mixture. 250 mL of the Second Solvent 2 and an additional 0.1 grams of the Carbodiimidization Catalyst are disposed in the flask. The flask and its contents are heated to about 85° C. under a static nitrogen atmosphere. However, the at least one carbodiimide compound remained precipitated in the flask despite the addition of the Second Solvent 2 and did not polymerize further.

Comparative Example 9

64.8 grams of a combination of Isocyanate Component 1 and Isocyanate Component 4, 0.144 grams of the Carbodiimidization Catalyst and 550 mL of the First Solvent 1 are disposed in a three neck round bottom flask equipped with a magnetic stirrer and a condenser to form a mixture. Isocyanate Component 1 and Isocyanate Component 4 are utilized in a 50/50 molar ratio, i.e., 32.4 grams of Isocyanate Component 1 and 39.09 grams of Isocyanate Component 4 are utilized. The mixture is heated to about 110° C., i.e., the boiling point temperature of the First Solvent 1, in 15-20 minutes under a static nitrogen atmosphere. The mixture is held at 110° C. under a static nitrogen atmosphere. However, after about 20 minutes, at least one carbodiimide compound is formed in the mixture, which precipitated in the mixture. 250 mL of the Second Solvent 2 is disposed in the flask. The flask and its contents are heated to about 85° C. under a static nitrogen atmosphere. However, the at least one carbodiimide compound remained precipitated in the flask despite the addition of the Second Solvent 2 and did not polymerize further.

Table 1 below summarizes the respective components (i.e., the Isocyanate Component, the Carbodiimidization Catalyst, the First Solvent and the Second Solvent) utilized in Examples 1-6 and Comparative Examples 1-9.

TABLE 1

| Example | Isocyanate Component | Carbodiimidization Catalyst | First Solvent | Second Solvent |
|---|---|---|---|---|
| Example 1 | Isocyanate Component 1 | Carbodiimidization Catalyst | First Solvent 1 | Second Solvent 2 |
| Example 2 | Isocyanate Component 1 | Carbodiimidization Catalyst | First Solvent 2 | Second Solent 1 |
| Example 3 | Isocyanate Component 1 | Carbodiimidization Catalyst | First Solvent 1 | Second Solvent 1 |
| Example 4 | Isocyanate Component 1 | Carbodiimidization Catalyst | First Solvent 2 | Second Solvent 2 |
| Example 5 | Isocyanate Component 1 | Carbodiimidization Catalyst | First Solvent 3 | Second Solvent 2 |
| Example 6 | Isocyanate Component 1 | Carbodiimidization Catalyst | First Solvent 3 | Second Solvent 2 |
| Comparative Example 1 | Isocyanate Component 1 | Carbodiimidization Catalyst | First Solvent 1 | None |
| Comparative Example 2 | Isocyanate Component 1 | Carbodiimidization Catalyst | First Solvent 2 | None |
| Comparative Example 3 | Isocyanate Component 1 | Carbodiimidization Catalyst | First Solvents 1 and 2 | None |
| Comparative Example 4 | Isocyanate Component 2 | Carbodiimidization Catalyst | First Solvent 1 | Second Solvent 2 |
| Comparative Example 5 | Isocyanate Component 1 | Carbodiimidization Catalyst | First Solvent 4 | None |
| Comparative Example 6 | Isocyanate Component 1 | Carbodiimidization Catalyst | First Solvent 5 | None |
| Comparative Example 7 | Isocyanate Component 3 | Carbodiimidization Catalyst | First Solvent 1 | Second Solvent 2 |
| Comparative Example 8 | Isocyanate Component 4 | Carbodiimidization Catalyst | First Solvent 1 | Second Solvent 2 |
| Comparative Example 9 | Isocyanate Components 1 and 4 | Carbodiimidization Catalyst | First Solvent 1 | Second Solvent 2 |

Table 2 below illustrates the respective results obtained from Examples 1-6 and Comparative Examples 1-9 above. Specifically, Table 2 below sets forth the number average molecular weight (Mn), the weight average molecular weight (Mw) and the polydispersity for the respective products formed in Examples 1-6 and Comparative Examples 1-9 above, as measured via a refractive index detector and HR columns.

TABLE 2

| Example | Mn | Mw | Polydispersity |
|---|---|---|---|
| Example 1 | Not Measurable | | |
| Example 2 | 1,269 | 2,413 | 1.33 |
| Example 3 | 3,339 | 78,444 | 23.49 |
| Example 4 | 1,224 | 2,798 | 2.29 |
| Example 5 | 2,814 | 210,614 | 74.80 |
| Example 6 | Not Measurable | | |
| Comparative Example 1 | 3,001 | 66,122 | 22.00 |
| Comparative Example 2 | 1,102 | 1,314 | 1.19 |
| Comparative Example 3 | 1,473 | 4,559 | 1.43 |
| Comparative Example 4 | Precipitated | | |
| Comparative Example 5 | 3,107 | 267,699 | 86.10 |
| Comparative Example 6 | 2,614 | 57,784 | 22.00 |
| Comparative Example 7 | No Polymerization | | |
| Comparative Example 8 | Precipitated | | |
| Comparative Example 9 | Precipitated | | |

Table 3 below illustrates the respective results obtained from Examples 1-6 and Comparative Examples 1-9 above. Specifically, Table 3 below sets forth the number average molecular weight (Mn), the weight average molecular weight (Mw) and the polydispersity for the respective products formed in Examples 1-6 and Comparative Examples 1-9 above, as measured via an evaporative light scattering detector. Additionally, Table 3 below sets forth the mole fraction percentage of the respective products formed in Examples 1-6 and Comparative Examples 1-9 above, as measured via an evaporative light scattering detector, having a weight average molecular weight (Mw) over 100,000, over 250,000, over 500,000 and over 1,000,000.

TABLE 3

| Example | Mn | Mw | Polydispersity | % fraction >1,000,000 | % fraction >500,000 | % fraction >250,000 | % fraction >100,000 |
|---|---|---|---|---|---|---|---|
| Example 1 | 6,700 | 216,000 | 19.4 | 4.646 | 13.976 | 23.218 | 44.737 |
| Example 2 | 1,240 | 2,210 | 1.8 | 0 | 0 | 0 | 0 |
| Example 3 | 2,460 | 31,200 | 12.7 | 0 | 0.02 | 0.33 | 4.94 |
| Example 4 | 1,300 | 2,270 | 1.7 | 0 | 0 | 0 | 0 |
| Example 5 | 2,680 | 9,170 | 3.4 | 0 | 0 | 0 | 0 |
| Example 6 | 2870 | 16900 | 5.9 | 0 | 0 | 0 | 0.08 |
| Comparative Example 1 | 2,190 | 11,280 | 5.2 | 0 | 0 | 0 | 0 |
| Comparative Example 2 | 1,210 | 2,160 | 1.8 | 0 | 0 | 0 | 0 |
| Comparative Example 3 | 1,440 | 2,820 | 2 | 0 | 0 | 0 | 0 |
| Comparative Example 4 | | | Precipitated | | | | |
| Comparative Example 5 | 2,340 | 12,600 | 5.4 | 0 | 0 | 0 | 0 |
| Comparative Example 6 | 2,600 | 12,500 | 4.8 | 0 | 0 | 0 | 0 |
| Comparative Example 7 | | | No Polymerization | | | | |
| Comparative Example 8 | | | Precipitated | | | | |
| Comparative Example 9 | | | Precipitated | | | | |

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A method of producing a high molecular weight polycarbodiimide having a mole fraction greater than 0 having a weight average molecular weight of at least about 250,000 as determined using evaporative light scattering, said method comprising the steps of:
providing toluene diisocyanate (TDI);
providing a carbodiimidization catalyst;
providing toluene as a first solvent;
polymerizing the toluene diisocyanate in the absence of other isocyanates for a first period of time in the first solvent and in the presence of the carbodiimidization catalyst to produce a reaction mixture including at least one carbodiimide compound and the first solvent;
combining tetrahydrofuran as a second solvent and the reaction mixture; and
polymerizing the at least one carbodiimide compound for a second period of time in the first and second solvents and in the presence of the carbodiimidization catalyst to produce the high molecular weight polycarbodiimide.

2. A method as set forth in claim 1 wherein the high molecular weight polycarbodiimide has a mole fraction greater than 0 having a weight average molecular weight of at least about 500,000 as determined using evaporative light scattering.

3. A method as set forth in claim 1 wherein the first period of time is from about 180 to about 420 minutes and wherein the second period of time is greater than about 100 minutes.

4. A method as set forth in claim 1 wherein the carbodiimidization catalyst comprises a phospholene compound.

5. A method as set forth in claim 1 further comprising the step of combining an additional amount of the carbodiimidization catalyst, the second solvent, and the reaction mixture.

6. A method as set forth in claim 1 further comprising the step of isolating the high molecular weight polycarbodiimide.

7. A high molecular weight polycarbodiimide formed according to the method of claim 1 and having a mole fraction greater than 0 having a weight average molecular weight of at least about 250,000 as determined using evaporative light scattering.

8. A high molecular weight polycarbodiimide as set forth in claim 7 having a tensile strength of at least about $3.9 \times 10^3$ psi, as measured in accordance with DIN 53504 S2.

9. A high molecular weight polycarbodiimide as set forth in claim 7 having an elongation at break of at least about 5.8%, as measured in accordance with DIN 53504 S2.

10. A high molecular weight polycarbodiimide as set forth in claim 7 having a melting temperature of greater than about 200° C.

11. A high molecular weight polycarbodiimide as set forth in claim 7 having a glass transition temperature of from about 50 to about 155° C.

12. A method as set forth in claim 1 wherein the high molecular weight polycarbodiimide has a mole fraction greater than 0 having a weight average molecular weight of at least about 1,000,000 as determined using evaporative light scattering.

13. A method as set forth in claim 1 wherein the high molecular weight polycarbodiimide has a mole fraction greater than 3 having a weight average molecular weight of at least about 1,000,000 as determined using evaporative light scattering.

14. A method as set forth in claim 13 wherein the high molecular weight polycarbodiimide has a mole fraction greater than 10 having a weight average molecular weight of at least about 500,000 as determined using evaporative light scattering.

15. A method as set forth in claim 14 wherein the high molecular weight polycarbodiimide has a mole fraction greater than 15 having a weight average molecular weight of at least about 250,000 as determined using evaporative light scattering.

16. A method as set forth in claim 1 wherein the high molecular weight polycarbodiimide has a mole fraction greater than 10 having a weight average molecular weight of at least about 500,000 as determined using evaporative light scattering.

17. A method as set forth in claim 1 wherein the high molecular weight polycarbodiimide has a mole fraction greater than 15 having a weight average molecular weight of at least about 250,000 as determined using evaporative light scattering.

18. A high molecular weight polycarbodiimide as set forth in claim 7 having a mole fraction greater than 0 having a weight average molecular weight of at least about 500,000 as determined using evaporative light scattering.

19. A high molecular weight polycarbodiimide as set forth in claim 7 having a mole fraction greater than 0 having a weight average molecular weight of at least about 1,000,000 as determined using evaporative light scattering.

20. A high molecular weight polycarbodiimide as set forth in claim 7 having a mole fraction greater than 3 having a weight average molecular weight of at least about 1,000,000 as determined using evaporative light scattering.

* * * * *